United States Patent [19]
Akira et al.

[11] Patent Number: 5,709,282
[45] Date of Patent: Jan. 20, 1998

[54] TRAVELING CONTROL SYSTEM FOR HYDRAULICALLY DRIVEN VEHICLE

[75] Inventors: Tatsumi Akira, Ibaraki-ken, Japan; Gianni Duri, Bologna; Dario Prealta, Torino, both of Italy

[73] Assignee: Fiat-Hatachi Excavators S.P.A., San Mauro Torinese, Italy

[21] Appl. No.: 625,588

[22] Filed: Mar. 28, 1996

[30] Foreign Application Priority Data

Mar. 31, 1995 [JP] Japan ............................ 7-076060

[51] Int. Cl.⁶ ........................................... B60K 26/00
[52] U.S. Cl. ............................... 180/307; 60/445
[58] Field of Search ........................ 180/305, 306, 180/307, 308, 242; 60/444, 451, 447, 445

[56] References Cited

U.S. PATENT DOCUMENTS

| | | | |
|---|---|---|---|
| 4,240,515 | 12/1980 | Kirkwood | 180/308 X |
| 4,241,577 | 12/1980 | Baldauf | 180/307 X |
| 4,350,220 | 9/1982 | Carman | 180/308 X |
| 4,530,416 | 7/1985 | Kasai | 180/307 |
| 4,554,992 | 11/1985 | Kassai | 180/307 |

FOREIGN PATENT DOCUMENTS 63-54521  4/1988  Japan ............................ B60K 20/14

Primary Examiner—Kevin Hurley
Attorney, Agent, or Firm—Larry W. Miller; John W. Stader; Frank A. Seemar

[57] ABSTRACT

A traveling control system for a hydraulically driven vehicle enables the vehicle to travel at a higher speed and also enables a vehicle body to be braked appropriately when the vehicle descends a slope with a travel control valve kept in its neutral position. The traveling control system includes pressure switches for detecting an operative state of a travel control valve, a detection line for detecting a shift position of a transmission, and a controller, a solenoid valve, load lines, a shuttle valve and a control line for cooperatively increasing the capacity of a travel motor upon the detection of that the travel control valve is in its neutral position and also the transmission is shifted to a high-speed gear. A timer function of the controller allows the capacity of the travel motor to be increased after the elapse of a predetermined time after the detection of that the travel control valve is in the neutral position. The load lines and the shuttle valve jointly serve as a hydraulic source for switching the motor capacity.

6 Claims, 6 Drawing Sheets

5,709,282

TRAVELING CONTROL SYSTEM FOR HYDRAULICALLY DRIVEN VEHICLE

BACKGROUND OF THE INVENTION

The present invention relates to a traveling control system for hydraulically driven vehicles such as hydraulic excavators, and more particularly to a traveling control system for hydraulically driven vehicles which comprises a variable displacement hydraulic travel motor as a drive source for traveling, and which controls a traveling speed by automatically changing the capacity of the travel motor depending on the traveling load.

As a traveling control system for hydraulically driven vehicles such as hydraulic excavators, there is hitherto known one comprising a hydraulic pump driven by a prime mover, a traveling hydraulic circuit including a variable displacement hydraulic travel motor driven by a hydraulic fluid supplied from the hydraulic pump and a travel control valve for controlling a flow rate of the hydraulic fluid supplied from the hydraulic pump to the travel motor, and motor capacity control means for increasing the capacity (tilting) of the travel motor when the load pressure of the travel motor becomes high during operation of the travel control valve, as described in JP, U, 63-54521.

In this traveling control system, when the vehicle is running with a light traveling load as experienced in traveling over level ground, for example, and hence the load pressure of the travel motor is small, the capacity (tilting) of the travel motor is controlled to be small so that the vehicle can travel at a high speed (with a small torque). On the other hand, when the vehicle is running with a heavy traveling load as experienced in traveling over an upward slope or under acceleration, for example, and hence the load pressure of the travel motor is high, the capacity (tilting) of the travel motor is controlled to be high so that the vehicle can travel (at a low speed) with a large torque while producing sufficient tractive force to ascend a slope.

Further, a brake valve is usually provided between the travel motor and the travel control valve in the traveling hydraulic circuit. When the vehicle is traveling under deceleration or descending a slope with the travel control valve kept in its neutral position, the circuit section between the brake valve and the travel motor forms a closed circuit, enabling the vehicle to speed down through a throttle of the brake valve and the set pressure of a relief valve.

To prevent a hunting in capacity control, pressure detection for the capacity control of the travel motor is usually made in the circuit section between the brake valve and the travel control valve. Therefore, when the vehicle travels with no pedal trod down and the travel control valve kept in its neutral position, the circuit section between the travel control valve and the brake valve is held under the reservoir pressure through the travel control valve and, as a result, the travel motor is controlled to the minimum capacity.

Additionally, a transmission capable of shifting between a high-speed gear and a low-speed gear is provided in an output section of the travel motor so that the traveling speed is switched over in two stages given by the high-speed gear and the low-speed gear upon operation of a changeover switch.

SUMMARY OF THE INVENTION

Recently, there has been a need for increasing speeds of hydraulically traveling vehicles. For realization of higher speeds, it is desired to diminish the pressure loss in the hydraulic circuit by increasing the hydraulic pressure and reducing the flow rate, taking into account input torque limiting control of the hydraulic pump. In this case, corresponding to a reduction in the flow rate, the minimum capacity of the travel motor must be set to be small, or the speed reducing ratio of the transmission must be set to be small for ensuring the traveling speed. Thus, the driving force is offset by the increased pressure. Increasing speeds of hydraulically traveling vehicles can also be realized by setting the speed reducing ratio of the transmission to be small.

Where the minimum capacity of the travel motor is set to be small, or the speed reducing ratio of the transmission is set to be small as mentioned above, no problems occur in ordinary traveling such as traveling over level ground and an upward slope, but the following problem is caused when the vehicle descends a slope with no pedal trod down and the travel control valve kept in its neutral position, i.e., without applying any driving force to the travel motor.

More specifically, when the vehicle descends a slope with no pedal trod down and the travel control valve kept in its neutral position, the circuit section between the brake valve and the travel motor forms a closed circuit so that the vehicle is sped down through the throttle of the brake valve and the set pressure of the relief valve, as explained above. At this time, however, because the circuit section between the travel control valve and the brake valve is held under the reservoir pressure through the travel control valve as mentioned above, the travel motor is controlled to the minimum capacity.

Also, at this time, because the minimum capacity of the travel motor is set to be small, or the speed reducing ratio of the transmission is set to be small for the above-mentioned reason, sufficient braking force cannot be produced and the vehicle body cannot be stopped or braked satisfactorily. Further, the temperature of the hydraulic fluid in the circuit may rise so high as to bring about a risk of damaging hydraulic equipment.

An object of the present invention is to provide a traveling control system for a hydraulically driven vehicle with which the vehicle can travel at a higher speed and a vehicle body can be braked appropriately when the vehicle descends a slope with a travel control valve kept in its neutral position.

To achieve the above object, the present invention is constituted as follows. Specifically, in a traveling control system for a hydraulically driven vehicle comprising a hydraulic pump driven by a prime mover, a variable displacement hydraulic travel motor driven by a hydraulic fluid supplied from the hydraulic pump, a travel control valve for controlling a flow rate of the hydraulic fluid supplied from the hydraulic pump to the travel motor, operation means for operating the travel control valve, and first motor capacity control means for increasing the capacity of the travel motor when the load pressure of the travel motor becomes high during operation of the travel control valve, the traveling control system further comprises first detecting means for detecting an operative state of the travel control valve, and second motor capacity control means for increasing the capacity of the travel motor when the first detecting means detects that the travel control valve is in its neutral position.

Preferably, the above traveling control system for a hydraulically driven vehicle further comprises a transmission provided in an output section of the travel motor and capable of shifting between a high-speed gear and a low-speed gear, and second detecting means for detecting a shift position of the transmission, the second motor capacity control means increasing the capacity of the travel motor when the first detecting means detects that the travel control valve is in its neutral position and also the second detecting means detects that the transmission is shifted to the high-speed gear.

Also preferably, the second motor capacity control means includes delay means for allowing the capacity of the travel motor to be increased after the elapse of a predetermined time after the detection of that the travel control valve is in its neutral position.

Further preferably, the second motor capacity control means comprises a hydraulic source, valve means for switching communication between the hydraulic source and a hydraulic actuator for driving a mechanism of varying the capacity of the travel motor, and a controller for operating the valve means to communicate the hydraulic source with the hydraulic actuator when the first detecting means detects that the travel control valve is in its neutral position.

Still further preferably, the first detecting means is means for detecting operation signals for both forward and backward traveling from the operation means.

The first detecting means may be means for detecting an operation signal for forward traveling only from the operation means. In this case, preferably, throttles for delaying return of the travel control valve from forward and backward traveling positions to the neutral position are disposed in respective pilot lines for transmitting the operation signals for forward and backward traveling to the travel control valve therethrough, and an aperture of the throttle for delaying return of the travel control valve from the forward traveling position is set to be smaller than an aperture of the throttle for delaying return of the travel control valve from the backward traveling position.

In the present invention arranged as set forth above, since the second motor capacity control means makes control to increase the capacity of the travel motor when the first detecting means detects that the travel control valve is in the neutral position, the travel motor is switched to the large capacity when the vehicle descends a slope with no pedal trod down and the travel control valve kept in the neutral position.

Therefore, in the case that the control system is designed to enable the vehicle to travel at a higher speed than conventional when running with a light traveling load as experienced in traveling over level ground, for example, by setting the minimum tilting of the travel motor to be smaller than conventional, or setting the speed reducing ratio of the transmission to be smaller than conventional, hydraulic braking force can be increased to brake the vehicle body appropriately in downslope traveling, and an excessive temperature rise of the hydraulic fluid in the circuit can be prevented. It is hence possible to prevent damages of hydraulic equipment otherwise caused by an excessive temperature rise of the hydraulic fluid in the circuit.

With the feature that the second motor capacity control means makes control to increase the capacity of the travel motor when the first detecting means detects that the travel control valve is in the neutral position and also the transmission is shifted to the high-speed gear, in the case of the transmission shifted to the high-speed gear, the travel motor is switched to the large capacity when the vehicle descends a slope with no pedal trod down and the travel control valve kept in the neutral position, whereby the hydraulic braking force can be increased to brake the vehicle body appropriately as mentioned above. On the other hand, in the case of the transmission shifted to the low-speed gear, the travel motor is not switched to the large capacity. However, predetermined braking force is produced through the low-speed gear of the transmission, and excessive speed-down otherwise caused at the low-speed gear because of the motor capacity being set to a small value is avoided so as to prevent the worsening of a speed-down feeling.

With the feature that the second motor capacity control means includes delay means for allowing the capacity of the travel motor to be increased after the elapse of a predetermined time after the detection of that the travel control valve is in its neutral position, a speed-down feeling at the high-speed gear just after the travel control valve is returned to the neutral position is improved, and the cavitation otherwise caused upon switching of the travel motor to the large tilting is prevented.

With the feature that the second motor capacity control means comprises a hydraulic source, valve means for switching communication between the hydraulic source and a hydraulic actuator for driving a mechanism of varying the capacity of the travel motor, and a controller for operating the valve means to communicate the hydraulic source with the hydraulic actuator when the first detecting means detects that the travel control valve is in its neutral position, the second motor capacity control means can be constructed in electro-hydraulic fashion.

With the feature that the first detecting means is means for detecting operation signals for both forward and backward traveling from the operation means, the travel motor is switched to the large capacity whenever the travel control valve is returned to the neutral position from any of the forward and backward traveling positions. Therefore, the same speed-down feeling can be provided in both forward and backward traveling.

When the first detecting means comprises means for detecting the operation signal for forward traveling only from the operation means, a difference in speed-down feeling between forward and backward traveling perceived when the travel control valve is returned to the neutral position can be reduced with the feature that an aperture of the throttle for delaying return of the travel control valve from the forward traveling position is set to be smaller than an aperture of the throttle for delaying return of the travel control valve from the backward traveling position. Also, a reduction in the production cost of the system can be achieved because a sensor for detecting the operation signal for forward traveling only is required in this case.

BRIEF DESCRIPTION OF THE DRAWINGS

A traveling control system for a hydraulically driven vehicle in accordance with the present invention will now be described, by way of example, with reference to the accompanying drawings, wherein.

DETAILED DESCRIPTION OF THE PREFERRED EMBODIMENT

Embodiments of the present invention will be described hereinafter with reference to the drawings. A first embodiment of the present invention will be described with reference to FIGS. 1 to 5.

Figure 1:
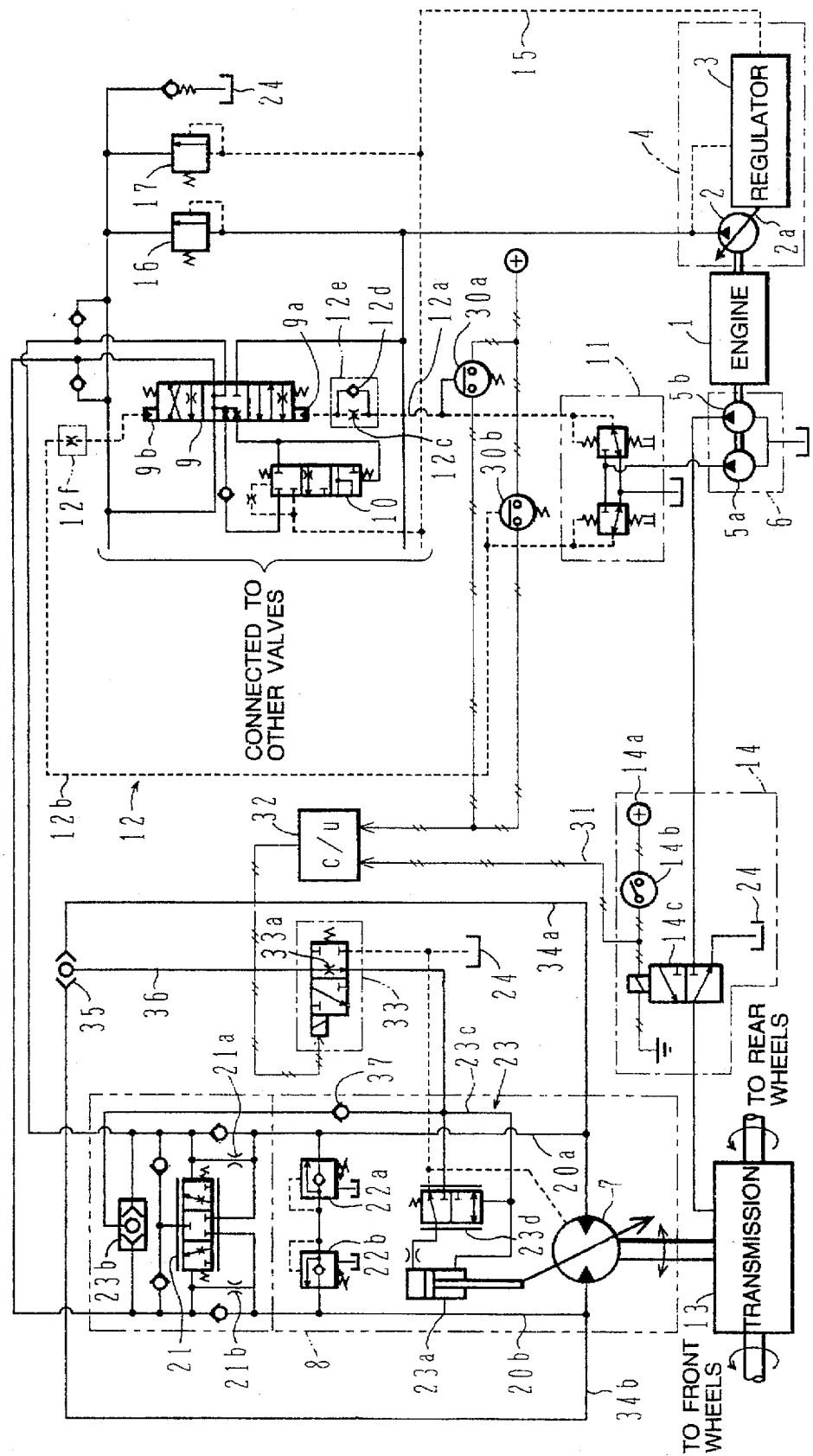
FIG. 1 is an overall schematic diagram of a traveling control system for a hydraulically driven vehicle according to a first embodiment of the present invention.

In FIG. 1, a traveling control system for a hydraulically driven vehicle of this embodiment includes an engine 1, a main hydraulic source 4 consisting of a variable displacement main pump 2 driven by the engine 1 and a regulator 3 for moving a swash plate 2a of the main pump 2 to control a tilting angle (displacement volume). A pilot hydraulic source 6 consists of two pilot pumps 5a, 5b and a relief valve (not shown) for setting an upper limit of pilot pressure. A traveling drive circuit 8 includes a variable displacement hydraulic travel motor 7 driven by a hydraulic fluid supplied from the main pump 2, and a travel control valve 9 incorporating a variable throttle to control a flow rate of the hydraulic fluid supplied from the main pump 2 to the travel motor 7.

A pressure compensating valve 10 includes a maximum load pressure detecting mechanism and is disposed downstream of the variable throttle in the travel control valve 9 for controlling a differential pressure across the variable throttle to be substantially constant. A traveling pilot valve device 11 is operated upon an operator treading a pedal (not shown) for producing a pilot pressure corresponding to the amount by which the pedal is operated, by the use of a hydraulic fluid from the pilot pump 5a. A pilot operation circuit 12 transmits the produced pilot pressure to an operative sector 9a, 9b of the travel control valve 9.

A transmission 13 disposed in an output section of the travel motor 7 is operable of shifting between a high-speed gear and a low-speed gear with operation of a not-shown hydraulic cylinder. A transmission shifting device 14 is provided for selectively introducing the hydraulic fluid from the pilot pump 5a to the hydraulic cylinder in the transmission 13 for shifting the transmission 13 to one of the high-speed gear and the low-speed gear. An LS line 15 for transmitting the maximum load pressure detected by the pressure compensating valve 10 loads sensing pressure (hereinafter abbreviated to LS pressure) regulator 3. A pump cutoff relief valve 16 limits a maximum delivery pressure of the main pump 2, and an LS main relief valve 17 limits an upper limit of the LS pressure in the LS line 15.

Figure 2:
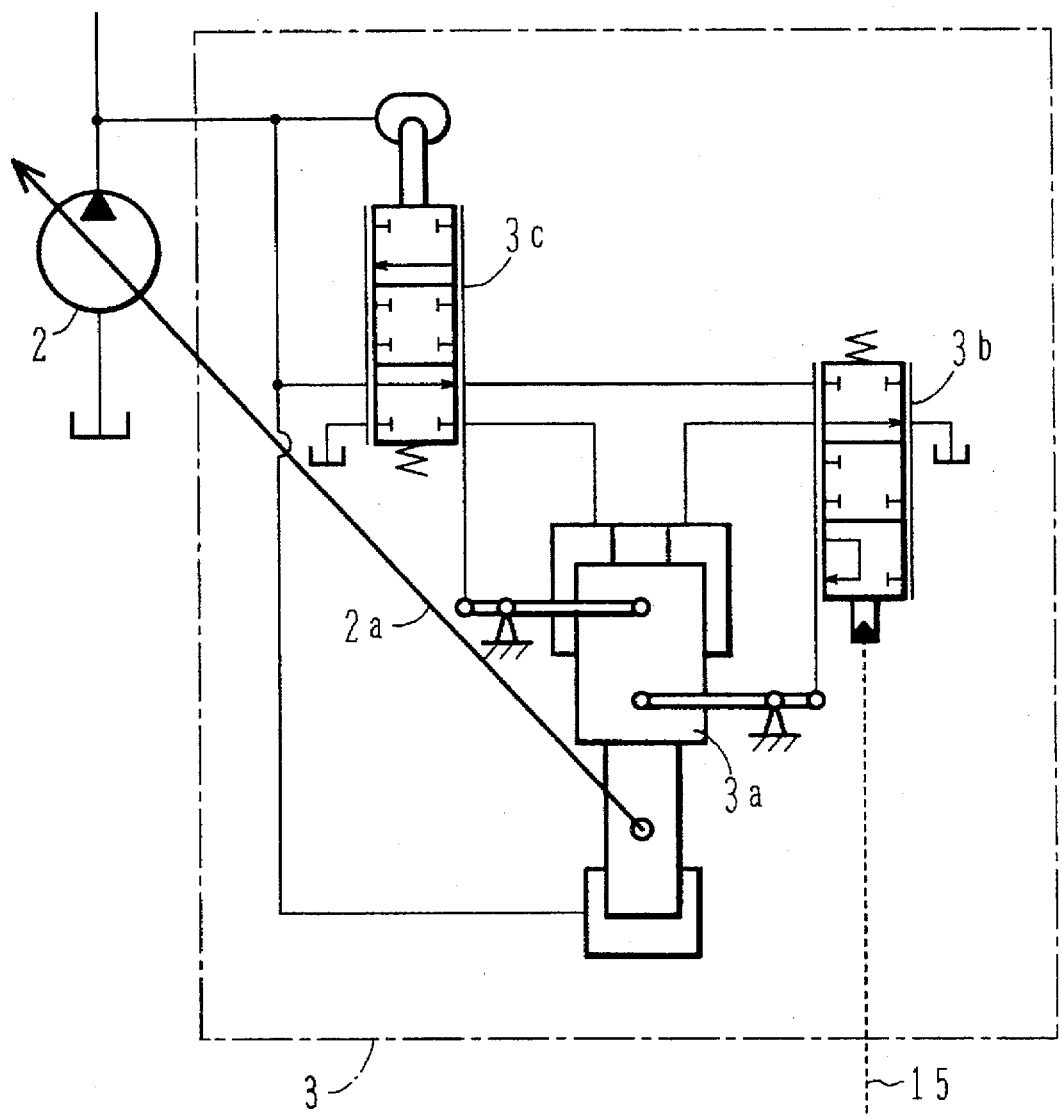
FIG. 2 is a diagram showing details of a regulator for a main pump shown in FIG. 1.

The regulator 3 comprises, as shown in FIG. 2, a control hydraulic actuator 3a for driving the swash plate 2a of the main pump 2, a first servo valve 3b for LS control for controlling a flow rate of the hydraulic fluid supplied to the hydraulic actuator 3a in response to the LS pressure introduced through the LS line 15 and then controlling the tilting angle of the swash plate 2a (the displacement volume of the main pump 2), and a second servo valve 3c for input torque limiting control for controlling a flow rate of the hydraulic fluid supplied to the hydraulic actuator 3a in response to the delivery pressure of the main pump 2 itself and then controlling the tilting angle of the swash plate 2a (the displacement volume of the main pump 2).

The traveling drive circuit 8 comprises a pair of main lines 20a, 20b for connecting the travel motor 7 to the travel control valve 9, a brake valve 21 and overload relief valves 22a, 22b disposed between the main lines 20a, 20b, and first motor capacity control means 23 for, during operation of the travel control valve 9, holding the travel motor 7 at a small tilting (small capacity) when the load pressure of the travel motor 7 is small, and switching the travel motor 7 to a large tilting (large capacity) when the load pressure of the travel motor 7 becomes large.

Here, for the purpose of increasing the speed of the hydraulically traveling vehicle, the minimum tilting (minimum capacity) of the travel motor 7 is set to be smaller than that of a conventional travel motor, and the first motor capacity control means switches the travel motor 7 to that minimum tilting when the load pressure of the travel motor 7 is small. For example, the minimum tilting (minimum capacity) is 100 cc/rev for the conventional travel motor, whereas it is 50 cc/rev for the travel motor 7 of this embodiment.

The travel control valve 9 is of normally open type constructed such that the sections of the main lines 20a, 20b between the travel control valve 9 and the brake valve 21 are communicated with a reservoir 24 when the travel control valve 9 is in its neutral position, and the hydraulic fluid in the reservoir 24 can be resupplied when the sections of the main lines 20a, 20b between the brake valve 21 and the travel motor 7 are subjected to negative pressure.

The brake valve 21 is a so-called counter balance valve and has a neutral position and also a left and right open positions. Throttles 21a, 21b are provided in parallel to the brake valve 21. Under a running condition where the travel motor 7 undergoes a negative load as experienced in traveling over a downward slope, for example, the brake valve 21 is returned to the neutral position so that a braking pressure is produced in the main line 20a or 20b on the delivery side of the travel motor 7 through the throttle 21a, 21b and the overload relief valve 22a, 22b.

The first motor capacity control means 23 comprises a control hydraulic cylinder 23a for moving the swash plate 7a of the travel motor 7 and switching the capacity of the travel motor 7, a shuttle valve 23b for selectively taking out higher one of load pressures in the main lines 20a, 20b, a control line 23c for introducing the load pressure taken out by the shuttle valve 23b, as a working pressure, to the rod side of the hydraulic cylinder 23a, and a switching valve 23d for communicating the bottom side of the hydraulic cylinder 23a to the reservoir 24 when the load pressure introduced to the control line 23c is low, and communicating the bottom side of the hydraulic cylinder 23a to the control line 23c when the load pressure introduced to the control line 23c becomes high.

The hydraulic cylinder 23a contracts due to the hydraulic fluid introduced to the rod side when the bottom side is under the reservoir pressure, thereby switching the travel motor 7 to the minimum tilting (minimum capacity; hereinafter referred to as small tilting or small capacity), and it extends due to an area difference between the bottom side and the rod side when the load pressure in the control line 23c is introduced to the bottom side, thereby switching the travel motor 7 to the maximum tilting (maximum capacity; hereinafter referred to as large tilting or large capacity).

With this arrangement, when the vehicle is running with a light traveling load as experienced in traveling over level ground, for example, the load pressure of the travel motor 7 is small and, therefore, the travel motor 7 is switched to the small tilting, enabling the vehicle to travel at a high speed (with a small torque). When the vehicle is running with a heavy traveling load as experienced in traveling over an upward slope or under acceleration, for example, the load pressure of the travel motor 7 is high and, therefore, the travel motor is switched to the large tilting, enabling the vehicle to travel (at a low speed) with a large torque.

The pilot operation circuit 12 comprises a pilot line 12a for transmitting the pilot pressure produced by the traveling pilot valve device 11 for forward traveling to the operative sector 9a of the travel control valve 9, and a pilot line 12b for transmitting the pilot pressure produced by the traveling pilot valve device 11 for backward traveling to the operative sector 9b of the travel control valve 9.

A slow return valve 12e consisted of a throttle 12c and a check valve 12d for slowing return of the travel control valve 9 from the forward traveling position to the neutral position to moderate a shock caused upon the vehicle stopping or under deceleration is disposed in the pilot line 12a, while a throttle 12f for slowing shift of the travel control valve 9 from the neutral position to the backward traveling position and return thereof from the backward traveling position to the neutral position to moderate shocks caused upon the vehicle starting backward or under acceleration and upon the vehicle stopping or under deceleration is disposed in the pilot line 12f. Both the throttles 12c and 12f have the same aperture, e.g., 1.4 mm.

The transmission shifting device 14 comprises a power supply 14a, a low-speed gear select switch 14b, and a solenoid valve 14c maintained in the illustrated position when the low-speed gear select switch 14b is opened, and excited when the switch 14b is operated to be closed, for shifting from the illustrated position to the opposite position. When the solenoid valve 14c is in the illustrated position, the not-shown hydraulic cylinder for gear shifting in the transmission 13 is communicated with the reservoir 24, whereupon the transmission 13 is shifted to the highspeed gear. When the low-speed gear select switch 14b is operated and the solenoid valve 14 is shifted from the illustrated position to the opposite position, the hydraulic fluid is supplied from the pilot pump 5b to the hydraulic cylinder for gear shifting in the transmission 13, whereupon the transmission 13 is shifted to the low-speed gear.

As other features in the arrangement, the traveling control system of this embodiment further comprises a pressure switch 30a connected to the pilot line 12a in the pilot operation circuit 12 and turning on when the pilot pressure for forward traveling, that is produced as pressure on the secondary side of the traveling pilot valve device 11, exceeds a value capable of shifting the travel control valve 9 from the neutral position to the operative position, a pressure switch 30b connected to the pilot line 12b in the pilot operation circuit 12 and turning on when the pilot pressure for backward traveling, that is produced as a pressure on the secondary side of the traveling pilot valve device 11, exceeds a value capable of shifting the travel control valve 9 from the neutral position to the operative position, a detection line 31 connected to a junction between the low-speed gear select switch 14b and the solenoid valve 14c in the transmission shifting device 14 for taking out a signal from the low-speed gear select switch 14b, a controller 32 for receiving signals from the pressure switches 30a, 30b and the signal sent through the detection line 31 and executing a predetermined sequence of processing, load lines 34a, 34b and a shuttle valve 35 connected to the main lines 20a, 20b at junctions between the travel motor 7 and the brake valve 21 for selectively taking out higher one of load pressures of the travel motor 7, a control line 36 for transmitting the load pressure taken out by the shuttle valve 35, as working pressure, to the control line 23c, a solenoid valve 33 disposed in the control line 36 and driven by a signal from the controller 32, and a check valve 37 for, when the load pressure transmitted from the control line 36 to the control line 23c is higher than the pressure taken out by the shuttle valve 23b, preventing that higher load pressure from being transmitted to the shuttle valve 23b.

When the drive signal from the controller 32 is on, the solenoid valve 33 is shifted to a closed position on the left side in the drawing where the control line 36 is disconnected, thereby cutting off the communication between the shuttle valve 35 and the control line 23c. When the drive signal from the controller 32 is turned off, the solenoid valve 33 is shifted to an operative position on the right side in the drawing, whereupon the shuttle valve 35 is communicated with the control line 23c through the control line 36 and a throttle 33a incorporated in the solenoid valve 33. The throttle 33a has a diameter of about 0.6 mm, for example, and serves as a hydraulic timer.

Figure 3:
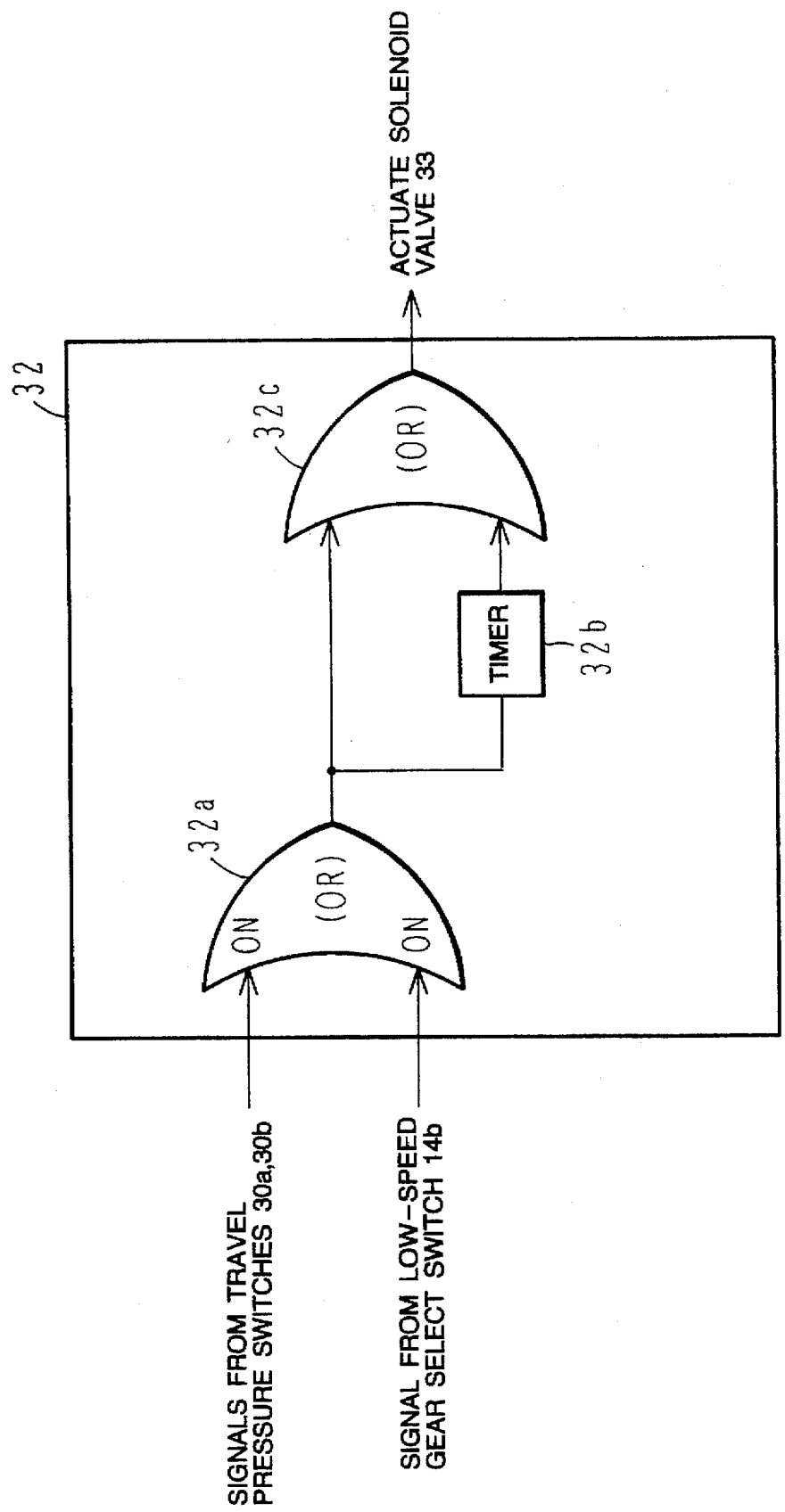
FIG. 3 is a diagram showing processing functions of a controller shown in FIG. 3.

Processing functions of the controller 32 are shown in a functional block diagram of FIG. 3. The controller 32 to the closed position on the left side in the drawing.

Where the low-speed gear select switch 14b is made open and the transmission 13 is shifted to the high-speed gear, the signal from the lowspeed gear select switch 14b is off. At this time, if one of the travel pressure switches 30a, 30b is turned on, the OR function 32c outputs an on-signal similarly to the above case so that the solenoid valve 33 is shifted to the closed position on the left side in the drawing. On the other hand, if the travel pressure switches 30a, 30b are both turned off with the signal from the low-speed gear select switch 14b kept off, the output of the OR function 32c is turned off after the elapse of a predetermined time set by the timer 32b, e.g., 1.5 second, so that the solenoid valve 33 is shifted to the operative position on the right side in the drawing where the function of the throttle 33a is effected.

In the above arrangement, the pressure switches 30a, 30b constitute first detecting means for detecting the operative state of the travel control valve 9. The controller 32, the solenoid valve 33, the load lines 34a, 34b, the shuttle valve 35 and the control line 36 constitute second motor capacity control means for increasing the capacity of the travel motor 7 when the first detecting means 30a, 30b detects that the travel control valve 9 is in the neutral position.

Also, the detection line 31 constitutes second detecting means for detecting the shift position of the transmission 13. The above second motor capacity control means 32, 33, 34a, 34b, 35, 36 makes control to increase the capacity of the travel motor 7 when the first detecting means 30a, 30b detects that the travel control valve 9 is in the neutral position and the second detecting means 31 detects that the transmission 13 is on the high-speed gear side.

Further, the timer function 32b of the controller 32 constitutes delay means for increasing the capacity of the travel motor 7 after the elapse of a predetermined time from the detection of that the travel control valve 9 is in the neutral position. Additionally, the load lines 34a, 34b and the shuttle valve 35 constitute a hydraulic source for the second motor capacity control means.

The operation of this embodiment thus arranged will now be described below.

First, in ordinary traveling such as traveling over level ground and an upward slope, the travel control valve is shifted from the neutral position with the pilot pressure in the pilot line 12a or 12b of the pilot operation circuit 12, one of the pressure switches 30a, 30b is turned on, and an on-signal is output from the OR function 32c of the controller 32 for shifting the solenoid valve 33 to the closed position on the left side in FIG. 1. Therefore, the communication between the control line 23c of the first motor capacity control means 23 and the shuttle valve 35 of the second motor capacity control means is cut off, whereby the load pressure taken out by the shuttle valve 23b is introduced to the control line 23c.

When the vehicle is running with a light traveling load as experienced in traveling over level ground, for example, of ordinary traveling, the load pressure of the travel motor 7 is small. Therefore, the switching valve 23d of the first motor capacity control means 23 communicates the bottom side of the hydraulic cylinder 23a with the reservoir 24, and the hydraulic cylinder 23a switches the travel motor 7 to the small tilting (small capacity), enabling the vehicle to travel at a high speed (with a small torque).

In this embodiment, as mentioned before, the minimum tilting (minimum capacity) of the travel motor 7 is set to be smaller than that of the conventional travel motor so that when the vehicle is running with a light traveling load as experienced in traveling over level ground, for example, it can travel at a higher speed than a conventional hydraulically traveling vehicle. This feature will be described below in detail.

As mentioned before, in this embodiment, the minimum tilting (minimum capacity) of the travel motor 7 is reduced to 50 cc/rev as compared with 100 cc/rev in the conventional travel motor. Here, the number of revolutions of the travel motor 7 (i.e., the traveling speed) is obtained by dividing the motor capacity by the traveling flow rate. Accordingly, the traveling speed must be the same if the flow rate of the hydraulic fluid supplied from the main pump 2 to the travel motor 7, i.e., the traveling flow rate, is reduced in proportion to a lowering of the motor capacity.

Figure 4:
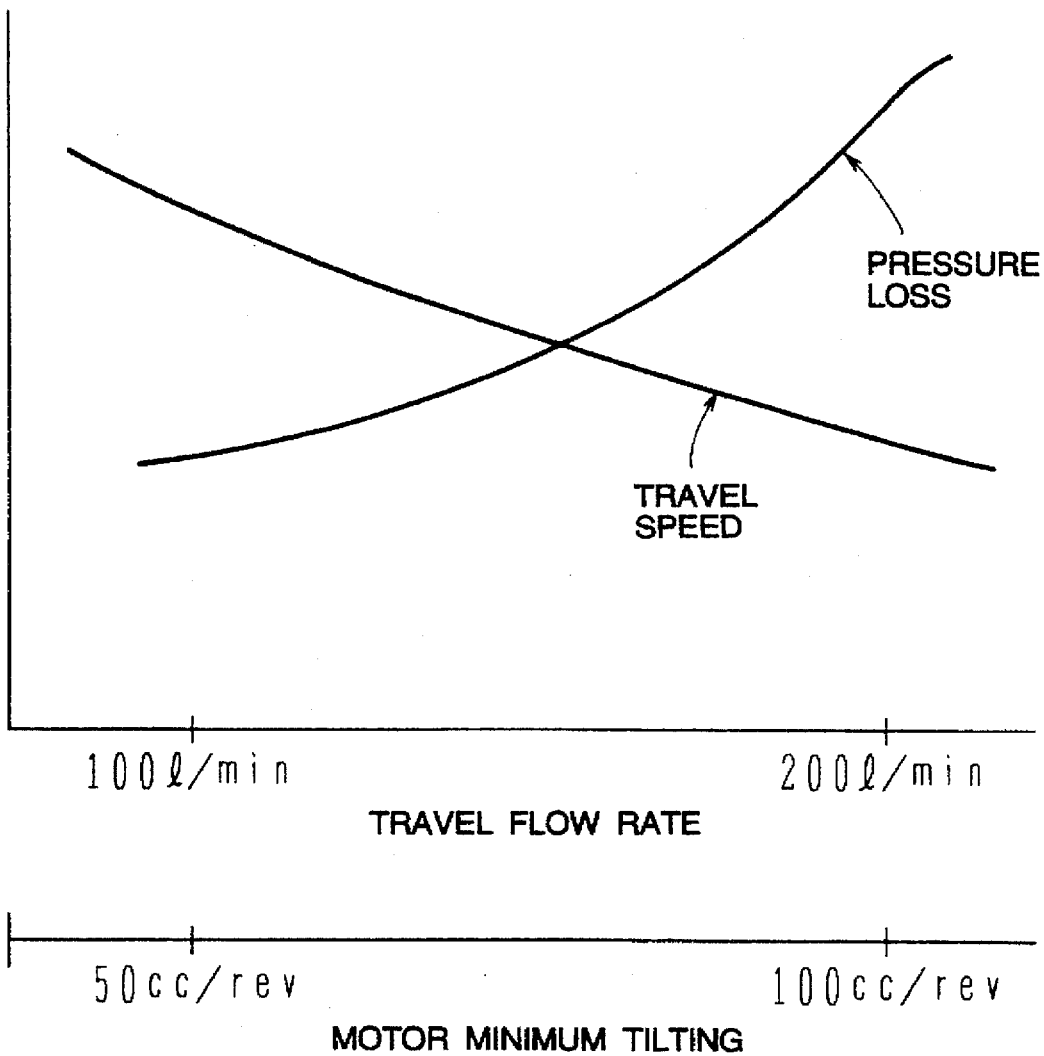
FIG. 4 is a graph showing changes in pressure loss and traveling speed resulted when the traveling flow rate is reduced.

FIG. 4 shows the relationship between the pressure loss in the circuit and the traveling speed which are changed when the minimum tilting (minimum capacity) of the travel motor 7 is continuously reduced from 100 cc/rev to 50 cc/rev and, correspondingly, the flow rate of the hydraulic fluid supplied from the main pump 2 to the travel motor 7 (i.e., the traveling flow rate) is continuously reduced from 200 liter/min to 100 liter/min.

Since the number of revolutions of the travel motor 7 corresponds to a value resulted by dividing the motor capacity by the traveling flow rate as stated above, the number of revolutions of the travel motor 7 (i.e., the traveling speed) must be the same if the minimum tilting (minimum capacity) of the travel motor 7 and the traveling flow rate are reduced in proportion. In practice, however, as a result of that the pressure loss in the circuit is reduced as the traveling flow rate lowers, the number of revolutions of the travel motor 7 (i.e., the traveling speed) is increased as the traveling flow rate reduces, as will be seen from FIG. 4.

Figure 5:
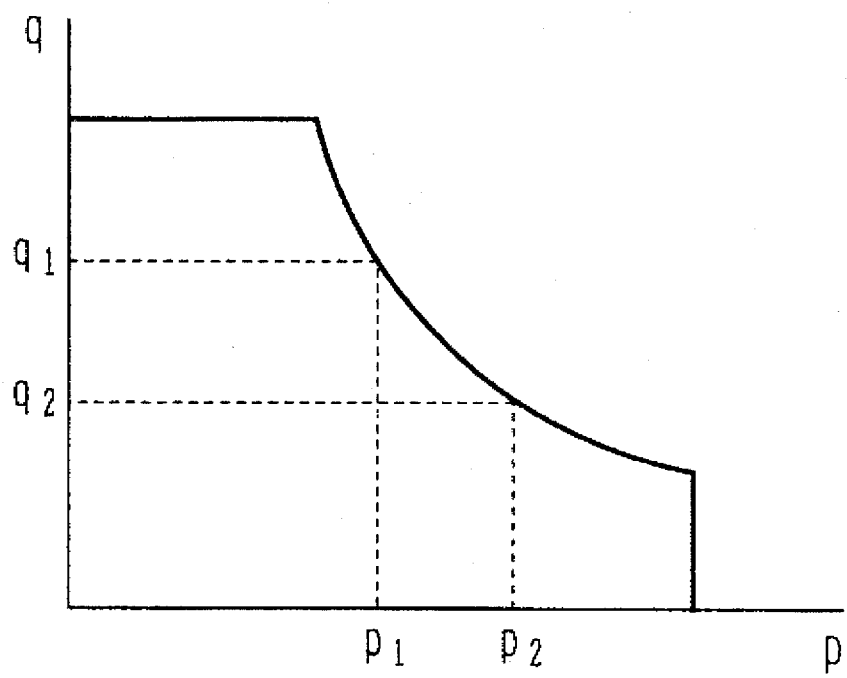
FIG. 5 is a graph showing characteristics of an input torque limiting control function of the regulator shown in FIG. 1.

On the other hand, a lowering of the driving force corresponding to the reduction in the traveling flow rate must be offset by increasing the hydraulic pressure. As explained above in connection with FIG. 2, the regulator 3 for the main pump 2 in this embodiment has the input torque limiting control function effected by the second servo valve 3c. With such a function, the maximum allowable delivery flow rate of the main pump 2 is controlled, as shown in FIG. 5, such that it is reduced as the delivery pressure of the main pump 2 increases. For example, the maximum allowable delivery flow rate is q1 when the delivery pressure of the main pump 2 is P1, but it is reduced to q2 if the delivery pressure of the main pump 2 increases to P2. Accordingly, it is possible to reduce the traveling flow rate and also increase the hydraulic pressure by utilizing the input torque limiting control function of the regulator 3.

Thus, the hydraulically traveling vehicle can travel at a higher speed with smaller pressure loss by increasing the hydraulic pressure and reducing the traveling flow rate so as to lessen the pressure loss in the circuit, and also by setting the minimum capacity of the travel motor 7 to a smaller value so as to offset a reduction in the traveling flow rate and ensure the traveling speed.

Meanwhile, when the vehicle is running with a heavy traveling load as experienced in traveling over an upward slope or under acceleration, for example, the load pressure of the travel motor becomes high. Therefore, the switching valve 23d communicates the bottom side of the hydraulic cylinder 23a with the control line 23c, and the hydraulic cylinder 23a switches the travel motor 7 to the large tilting (large capacity), enabling the vehicle to travel (at a low speed) with a large torque while producing sufficient tractive force to ascend a slope.

The above capacity switching control of the travel motor 7 is carried out likewise regardless of the shift position of the transmission 13.

Next, when the vehicle descends a slope with no pedal trod down and the travel control valve 9 kept in the neutral position, i.e., without applying any driving force to the travel motor 7, under the condition where the low-speed gear select switch 14b of the transmission shifting device 14 is closed and the transmission 13 is shifted to the low-speed gear, the signal from the low-speed gear select switch 14b is on, an on-signal is output from the OR function 32c of the controller 32, and the solenoid valve 33 is shifted to the closed position on the left side in FIG. 1.

Therefore, the communication between the control line 23c of the first motor capacity control means 23 and the shuttle valve 35 of the second motor capacity control means is cut off, whereby the pressure taken out by the shuttle valve 23b is introduced to the control line 23c. At this time, because the travel control valve 9 of normally open type is in the neutral position, the sections of the main lines 20a, 20b between the travel control valve 9 and the brake valve 21 are communicated with the reservoir 24. Those main line sections are thus under the reservoir pressure that is also introduced to the control line 23c.

Therefore, the switching valve 23d of the first motor capacity control means 23 communicates the bottom side of the hydraulic cylinder 23a with the reservoir 24, and the hydraulic cylinder 23a switches the travel motor 7 to the small tilting (small capacity). In addition, because the brake valve 21 is returned to the neutral position, the circuit section between the brake valve 21 and the travel motor 7, including corresponding parts of the main lines 20a, 20b, forms a closed circuit to produce a braking pressure in the main line 20a or 20b on the delivery side of the travel motor 7 through the throttle 21a, 21b and the overload relief valve 22a, 22b.

Accordingly, even if the travel motor 7 is switched to the small tilting as mentioned above, predetermined braking force is produced since the low-speed gear select switch 14b is closed and the transmission 13 is shifted to the low-speed gear. As a result, the vehicle body can be stopped or braked appropriately. Furthermore, the fact that the travel motor 7 is switched to the small tilting is rather effective to prevent the worsening of a speed-down feeling otherwise occurred at the low-speed gear.

On the other hand, when the vehicle descends a slope with the travel control valve kept in the neutral position similarly to the above case, but under the condition where the low-speed gear select switch 14b of the transmission shifting device 14 is made open and the transmission 13 is shifted to the high-speed gear, the signals from the pressure switches 30a, 30b are both off and the signal from the low-speed gear select switch 14b is also off. Hence, an off-signal is output from the OR function 32c of the controller 32 and the solenoid valve 33 is shifted to the operative position on the right side in FIG. 1 where the throttle 33a is disposed.

Therefore, the communication between the control line 23c of the first motor capacity control means 23 and the shuttle valve 35 of the second motor capacity control means is established, whereby the pressure taken out by the shuttle valve 35 is introduced to the control line 23c. At this time, because the brake valve 21 is returned to the neutral position, there produces a braking pressure in the main line 20a or 20b on the delivery side of the travel motor 7 and this high braking pressure is introduced to the control line 23c. Accordingly, the switching valve 23d of the first motor capacity control means 23 communicates the bottom side of the hydraulic cylinder 23a with the control line 23c, and the hydraulic cylinder 23a switches the travel motor 7 to the large tilting (large capacity), thereby increasing hydraulic braking force imposed on the travel motor 7.

In this embodiment, as mentioned before, the minimum tilting (minimum capacity) of the travel motor 7 is set to be smaller than that of the conventional travel motor for the purpose of increasing the speed of the hydraulically traveling vehicle. Therefore, if the travel motor 7 is switched to the small tilting as with the above case of the transmission 13 being shifted to the low-speed gear side when the vehicle descends a slope with the travel control valve kept in the neutral position under the condition where the transmission 13 is shifted to the high-speed gear, as mentioned above, sufficient braking force could not be produced and the vehicle body could not be stopped or braked satisfactorily. This may raise the temperature of the hydraulic fluid in the circuit so high as to bring about a risk of damaging hydraulic equipment.

As explained above, in this embodiment, the travel motor 7 is switched to the large tilting (large capacity), thereby increasing hydraulic braking force imposed on the travel motor 7. Accordingly, even if the transmission 13 is shifted to the high-speed gear, predetermined braking force is produced and the vehicle body can be stopped or braked satisfactorily. This is effective to suppress generation of heat in the circuit between the brake valve 21 and the travel motor 7, including corresponding parts of the main lines 20a, 20b. In some cases, it is also possible to prompt the operator to tread the pedal down so that the cold hydraulic fluid is newly supplied to the circuit to prevent an excessive temperature rise of the hydraulic fluid in the circuit.

Immediately after the running mode is shifted from ordinary traveling to downslope traveling and the travel control valve 9 is returned to the neutral position while the transmission 13 is kept on the high-speed gear side, the presence of the timer function 32b in the controller 32 allows the output of the OR function 32c to turn off after the elapse of a predetermined time, e.g., 1.5 second, set by the timer 32b from the turning from an on-state to an offstate of the signal from the travel pressure switch 30a or 30b. The solenoid valve 33 is shifted to the operative position on the right side in the drawing with such a time lag.

Further, since the throttle 33a as a hydraulic timer exists in the operative position of the solenoid valve 33, the travel motor 7 is prevented from switching to the large tilting abruptly when the solenoid valve 33 is shifted to the operative position. It is therefore possible to avoid an abrupt speed-down just at the time the travel control valve 9 is returned to the neutral position, improve a speed-down feeling at the high-speed gear, and prevent the cavitation otherwise caused upon switching of the travel motor 7 to the large tilting.

With this embodiment, as described above, since the minimum tilting of the travel motor 7 is set to be smaller than that of the conventional travel motor, the vehicle can travel at a higher speed than conventional when running with a light traveling load as experienced in traveling over level ground, for example. Also, since the travel motor 7 is switched to the large tilting when the vehicle descends a slope with no pedal trod down and the travel control valve 9 kept in the neutral position, the hydraulic braking force can be increased to brake the vehicle body appropriately and an excessive temperature rise of the hydraulic fluid in the circuit can be prevent. It is hence possible to prevent damages of hydraulic equipment otherwise caused by an excessive temperature rise of the hydraulic fluid in the circuit.

Further, since the timer function 32b is included in the controller 32 and the throttle 33a as a hydraulic timer exists in the operative position of the solenoid valve 33, a speed-down feeling at the high-speed gear just after the travel control valve 9 is returned to the neutral position is improved, and the cavitation otherwise caused upon switching of the travel motor 7 to the large tilting can be prevented.

Additionally, since the capacity control of the travel motor 7 in accordance with the switching of the solenoid valve 33 is performed only when the transmission 13 is on the high-speed gear side, the worsening of a speed-down feeling otherwise occurred when the transmission 13 is on the low-speed gear side can be prevented.

Figure 6:
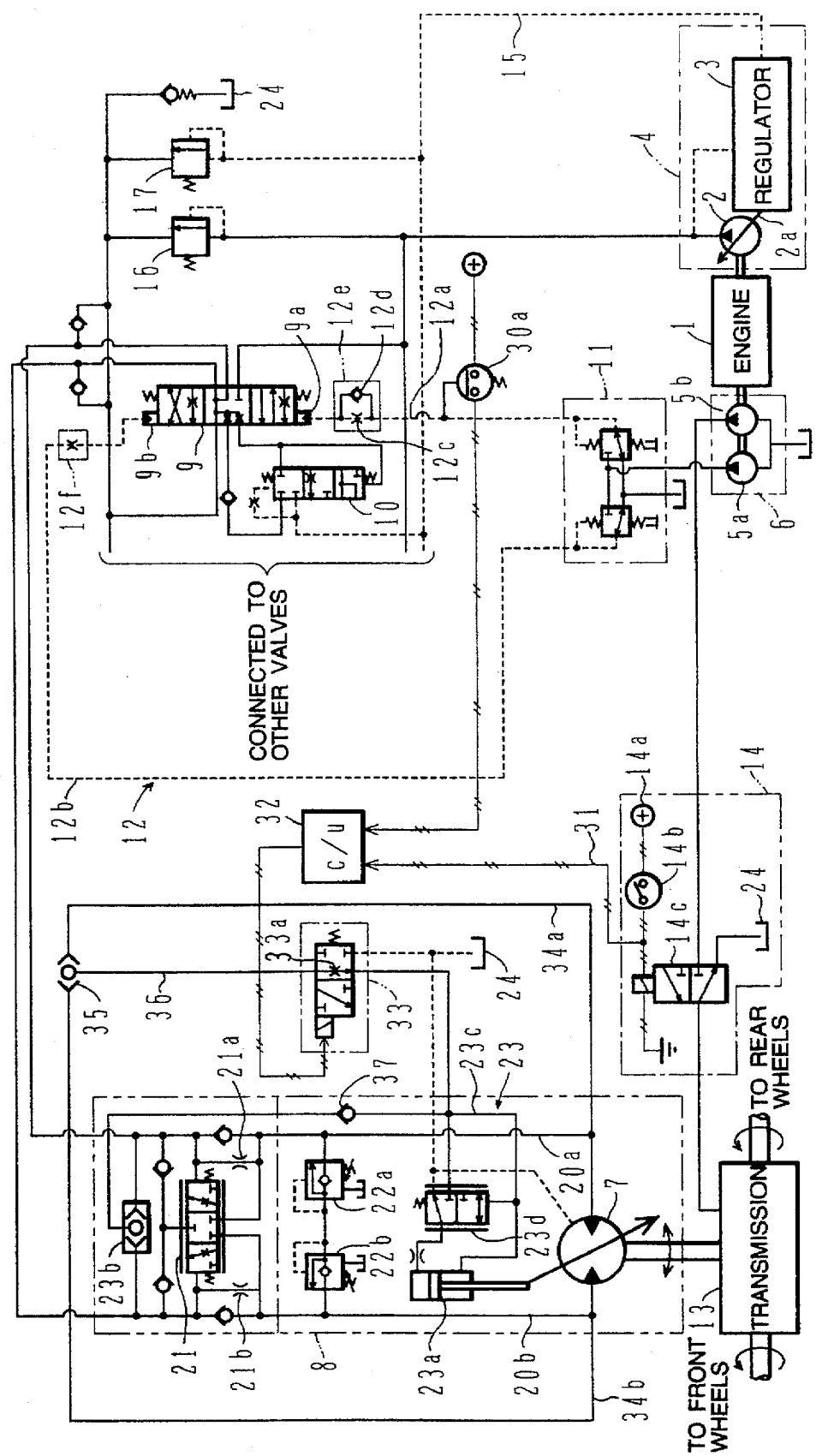
FIG. 6 is an overall schematic diagram of a traveling control system for a hydraulically driven vehicle according to a second embodiment of the present invention.

A second embodiment of the present invention will be described with reference to FIG. 6. In this embodiment, only the pilot pressure for forward traveling is detected as the first detecting means for detecting the operative state of the travel control valve 9. In FIG. 6, identical members to those in FIG. 1 are denoted by the same numerals.

Referring to FIG. 6, in the pilot line 12a of the pilot operation circuit 12, a pressure switch 30a is only disposed which turns on when the pilot pressure for forward traveling, that is produced as a pressure on the secondary side of the traveling pilot valve device 11, exceeds a value capable of shifting the travel control valve 9 from the neutral position to the operative position. A signal from the pressure switch 30a is input to the controller 32. A throttle 12c of a slow return valve 12e disposed in the pilot line 12a has a smaller aperture than a throttle 12f disposed in a pilot line 12b. For example, the aperture of the throttle 12f is the same 1.4 mm as in the above first embodiment, whereas the aperture of the throttle 12c is 0.8 mm.

In this embodiment, when the vehicle is traveling backward under the ordinary running condition with the transmission 13 shifted to the high-speed gear, the signal from the pressure switch 30a is off and the signal from the low-speed gear select switch 14b is also off. Hence, the solenoid valve 33 is shifted to the operative position as shown, and the communication between the shuttle valve 35 and the control line 23c is established. In this case, however, since the load pressure taken out by the shuttle valve 23b is introduced to the control line 23c, the traveling condition is not substantially different from that in the case of the solenoid valve 33 being shifted to the closed position.

Further, since the throttle 12c in the pilot line 12a on the forward traveling side has the smaller aperture, a difference in speed-down feeling between forward and backward traveling can be reduced. Accordingly, this embodiment can also provide advantages almost similar to those in the first embodiment. In addition, since the pressure switch is disposed only in the pilot line 12a on the forward traveling side, the embodiment can achieve a reduction in the production cost of the traveling control system.

It should be understood that while the minimum capacity of the travel motor is set to a small value for increasing the speed of the hydraulically traveling vehicle in the above embodiments, the traveling speed can also be increased by setting the speed reducing ratio of the transmission to a small value. The present invention is also applicable to such a modified case with similar resultant advantages.

According to the present invention, since the capacity of the travel motor is increased upon detection of that the travel control valve is in the neutral position, the hydraulic braking force can be increased to brake the vehicle body appropriately in downslope traveling, while increasing the speed of the hydraulically traveling vehicle, and an excessive temperature rise of the hydraulic fluid in the circuit can be prevented. It is hence possible to prevent damages of hydraulic equipment otherwise caused by an excessive temperature rise of the hydraulic fluid in the circuit.

Also, since the capacity of the travel motor is increased when the travel control valve is in the neutral position and the transmission is on the high-speed gear side, the worsening of a speed-down feeling otherwise occurred when the transmission is on the low-speed gear side can be prevented.

Further, since the capacity of the travel motor is increased after the elapse of a predetermined time after the detection of that the travel control valve is in the neutral position, a speed-down feeling at the high-speed gear just after the travel control valve is returned to the neutral position is improved, and the cavitation otherwise caused upon switching of the travel motor to the large tilting can be prevented.

Additionally, since the first detecting means comprises means for detecting the operation signal for forward traveling only and the aperture of the throttle for delaying return of the travel control valve from the forward traveling position is set to be smaller than that of the throttle for delaying return of the travel control valve from the backward traveling position, it is possible to reduce a difference in speed-down feeling between forward and backward traveling perceived when the travel control valve is returned to the neutral position, and also achieve a reduction in the production cost of the system.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a hydraulically driven vehicle having a hydraulic pump driven by a prime mover; a variable displacement hydraulic travel motor driven by a hydraulic fluid supplied from the hydraulic pump; a travel control valve for controlling a flow rate of the hydraulic fluid supplied from said hydraulic pump to said travel motor; operation means for operating said travel control valve; and first motor capacity control means for increasing the capacity of said travel motor when the load pressure of said travel motor becomes high during operation of said travel control valve, an improved traveling control system comprising:

first detecting means for detecting an operative state of said travel control valve, and second motor capacity control means for increasing the capacity of said travel motor when said first detecting means detects that said travel control valve is in its neutral position.

2. The hydraulically driven vehicle according to claim 1, further comprising a transmission provided in an output section of said travel motor and capable of shifting between a high-speed gear and a low-speed gear, and second detecting means for detecting a shift position of said transmission, said second motor capacity control means increasing the capacity of said travel motor when said first detecting means detects that said travel control valve is in its neutral position and also said second detecting means detects that said transmission is shifted to the high-speed gear.

3. The hydraulically driven vehicle according to claim 1 wherein said second motor capacity control means includes delay means for allowing the capacity of said travel motor to be increased after the elapse of a predetermined time after the detection of that said travel control valve is in its neutral position.

4. The hydraulically driven vehicle according to claim 1, wherein said second motor capacity control means comprises a hydraulic source, valve means for switching communication between said hydraulic source and a hydraulic actuator for driving a mechanism of varying the capacity of said travel motor, and a controller for operating said valve means to communicate said hydraulic source with said hydraulic actuator when said first detecting means detects that said travel control valve is in its neutral position.

5. The hydraulically driven vehicle according to claim 1, wherein said first detecting means is means for detecting operation signals for both forward and backward traveling from said operation means.

6. The hydraulically driven vehicle according to claim 1, wherein said first detecting means is means for detecting an operation signal for forward traveling only from said operation means, throttles for delaying return of said travel control valve from forward and backward traveling positions to the neutral position are disposed in respective pilot lines for transmitting the operation signals for forward and backward traveling to said travel control valve therethrough, and an aperture of said throttle for delaying return of said travel control valve from the forward traveling position is set to be smaller than an aperture of said throttle for delaying return of said travel control valve from the backward traveling position.

* * * * *